April 17, 1956 K. P. ZUBAY 2,742,135
ARTICLE SORTING DEVICE
Filed Dec. 24, 1951 5 Sheets-Sheet 1
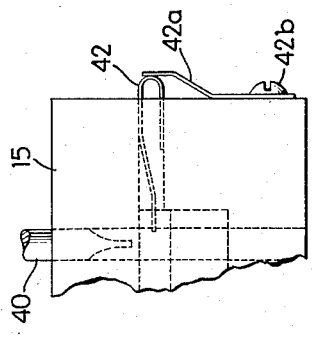
FIG. 1a.
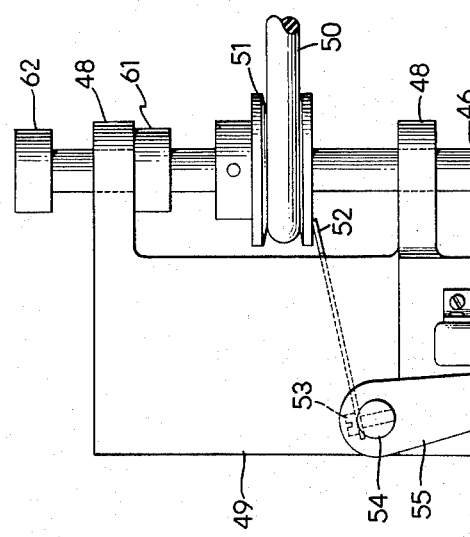
FIG. 1.
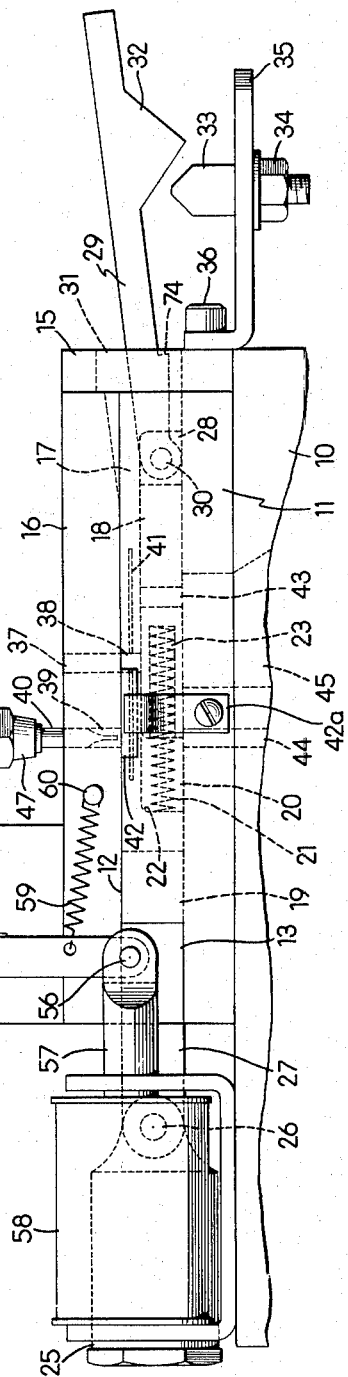
INVENTOR
KENNETH P. ZUBAY
BY
*G. R. Gugger*
AGENT April 17, 1956 K. P. ZUBAY 2,742,135
ARTICLE SORTING DEVICE
Filed Dec. 24, 1951 5 Sheets—Sheet 2

INVENTOR
KENNETH P. ZUBAY
BY
AGENT

April 17, 1956 K. P. ZUBAY 2,742,135
ARTICLE SORTING DEVICE
Filed Dec. 24, 1951 5 Sheets-Sheet 3

INVENTOR
KENNETH P. ZUBAY
BY
*G. R. Gugger*
AGENT

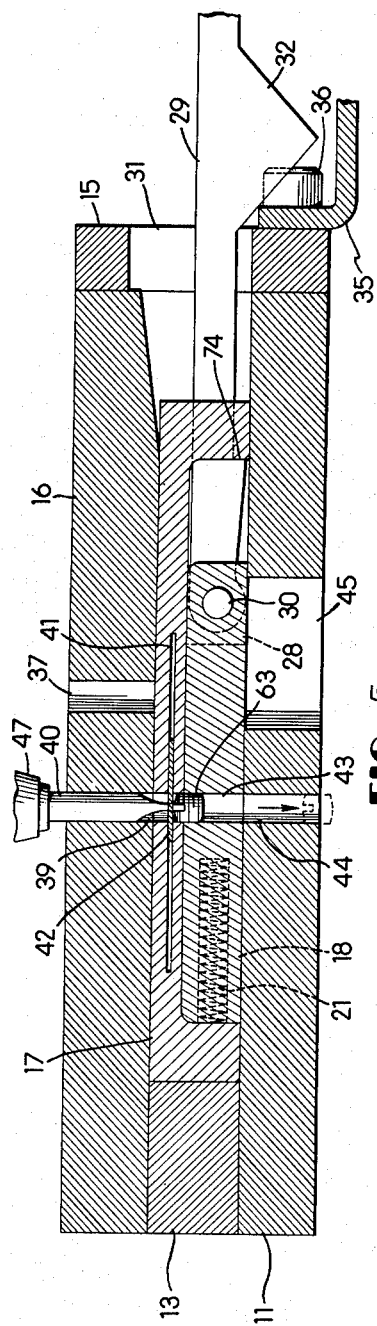
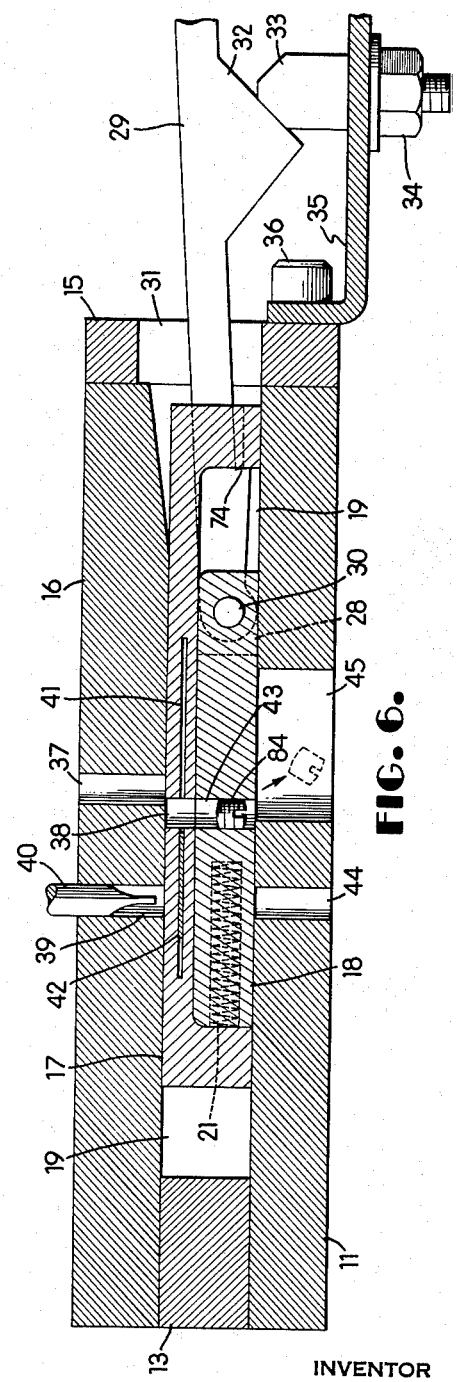

United States Patent Office 2,742,135
Patented Apr. 17, 1956

2,742,135

ARTICLE SORTING DEVICE

Kenneth P. Zubay, Endicott, N. Y., assignor to International Business Machines Corporation, New York, N. Y., a corporation of New York Application December 24, 1951, Serial No. 263,107

4 Claims. (Cl. 198—31)

This invention relates generally to assorting mechanisms, and relates more particularly to a mechanism for conveying articles to a testing mechanism and for conveying the articles from the testing mechanism to different destinations depending upon whether or not the articles are properly positioned or not.

The particular testing mechanism used in the illustrative embodiment of the present invention is of a type adapted to test articles having a non-circular configuration in one end, such for instance, as the headless set screws used in the assembly of relays. It is to be understood that the present invention may be used with other types of testing mechanisms than the particular one shown.

In screw inserting machines of the type currently in use for such assembly operations, the screws are successively fed to an inserting station where each screw is positively driven into a tapped hole or the like in an article that is to be assembled. These articles are successively indexed into position to receive a screw. In such an operation the screws must discharge from the feed means in a predetermined manner in order to assume the proper position at the inserting station. Should the feeding means present a screw to the inserting station in a position other than the predetermined proper position then the positive drive means will fail to drive the screw from said station and the article in position to be assembled will be indexed away without receiving a screw resulting in a faulty assembly.

The feeding means commonly comprises a chute conveying the screws from a source of supply to the inserting station under the force of gravity. The screws are directed into the intake end of the chute from a supply bin or the like and due to the jumbled condition of the screws in the bin it quite frequently happens that screws enter the chute in other than the proper position thereby resulting in faulty assembly operations.

During the course of such an operation, then, it was found desirable to feed the screws to a suitable testing mechanism to determine whether they were properly positioned for feeding to the inserting station of the assembly machine. The form of testing mechanism chosen for this operation includes a rotary blade member which is adapted to test the ends of the screws being conveyed thereto. A suitable mechanism is then required to select the properly positioned screws and convey them to the inserting station and to convey the improperly positioned screws to a reject box or the like.

The present invention is designed to meet these conditions, and is generally arranged relative to the assembly machine so that the accepted output of the testing mechanism will be delivered at the proper feeding position for the inserting station.

The primary object of the present invention is to provide means for rejecting improperly positioned articles from an intermittently movable line of such articles.

A further object of the invention is to provide a mechanism for accepting an output of articles from a testing mechanism and selectively conveying said articles to different destinations depending upon whether the articles are properly positioned or not.

A still further object of the invention is to provide a mechanism for accepting an output of articles from a testing mechanism and selectively conveying said articles to different destinations depending upon whether the articles are properly positioned or not and having means for cyclically locking said mechanism in the position where properly positioned articles will be conveyed to their proper destination.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a vertical view of the device.

Fig. 1a is a partial end view showing the relationship between the blade member and the spring blade.

Fig. 5 is a section similar to Fig. 4 showing the action of the selector mechanism in selecting a properly positioned article.

Fig. 6 is a similar section showing the action of the selector mechanism in rejecting an improperly positioned article.

Figure 2:
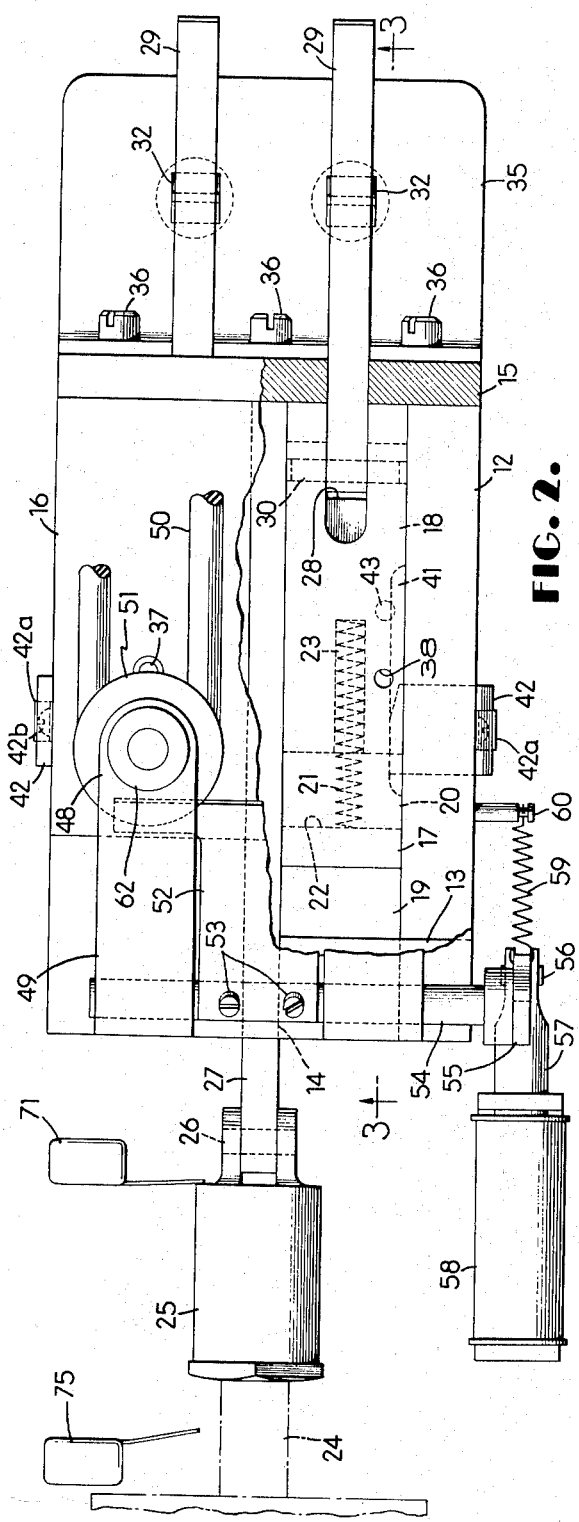
Fig. 2 is a detail plan view with certain of the upper structure removed.

As shown in Fig. 1, the frame structure of the device includes a base 10 on which is mounted a base block 11. With the exception of a portion of the two corners at the left end of the block, the two longer sides 12 of said block extend upward to give the block the shape of a "U" in the vertical plane. In each of said two corners there is attached a locating block 13 having the same height as the extended portion of the sides 12. The locating blocks 13 extend across the width of the base block but do not meet, leaving a narrow passageway indicated at 14 in Fig. 2. At the right end of the base block there is attached an end plate 15 and mounted on top of the locating blocks and attached to the inside surface of said end plate is a cover plate 16 which completes the structure to form a housing within which a pair of selector mechanisms operate as will be presently described.

The present device as illustrated in Fig. 2 embodies a housing structure, as just described, which is divided in half, each half embodying one selector mechanism, to facilitate the simultaneous selection of articles from two separate conveying lines. Each half of the device is identical in arrangement and operation and therefore the detail description to follow will be restricted, for simplicity, to one selector mechanism which is sufficient to show the selection of articles from one conveying line of such articles.

A selector mechanism comprises a pair of slide members indicated as a top slide 17 and a bottom slide 18 arranged for reciprocation within a chamber 19 in the housing unit. The bottom slide is further arranged for reciprocation within a cavity 20 in the underside of the top slide, the two slides normally being positioned in the relationship shown in Figs. 1 and 3 by means of a spring 21 which extends between the inner surface 22 of the top slide and a spring retaining hole 23 in the bottom slide.

The bottom slide 18 is positively powered for reciprocation by a conventional air cylinder (not shown) having a piston shaft, indicated at 24 in Fig. 2, which is connected to a coupling 25. The other end of the coupling is connected by means of a pin 26 to an arm 27 which extends through the passageway 14 and attaches to the side of the bottom slide.

The right-hand ends of the top and bottom slides are provided with a slot 28 into which extends a latch lever 29. The latch lever is pivoted to the bottom slide by means of a pin 30 and extends out through the housing unit by way of a slot 31 in the end plate 15. Said latch lever has a triangular projection 32 which is adapted to operate against a trip pin 33 (Fig. 1) fastened by means of a bolt 34 to a bracket 35 which is in turn fastened to the end plate 15 by the bolts 36. As will be later shown, the latch lever and trip pin cooperate to latch the bottom slide against movement during a portion of its operating cycle.

The machine as illustrated herein is adapted more particularly for the feeding of headless set screws which are thrown into a hopper by any suitable means. The screws are conveyed from the hopper (not shown) through a suitable chute (not shown) and into a passageway 37 in the cover plate 16. The cross-sectional area of the hopper chute and the passageway 37 is slightly greater than the similar area at the maximum diameter of the screws but less than the area of a longitudinal section of screw, so that the screws will be delivered into the passageway 37 only in lengthwise position for endwise movement.

Figure 3:
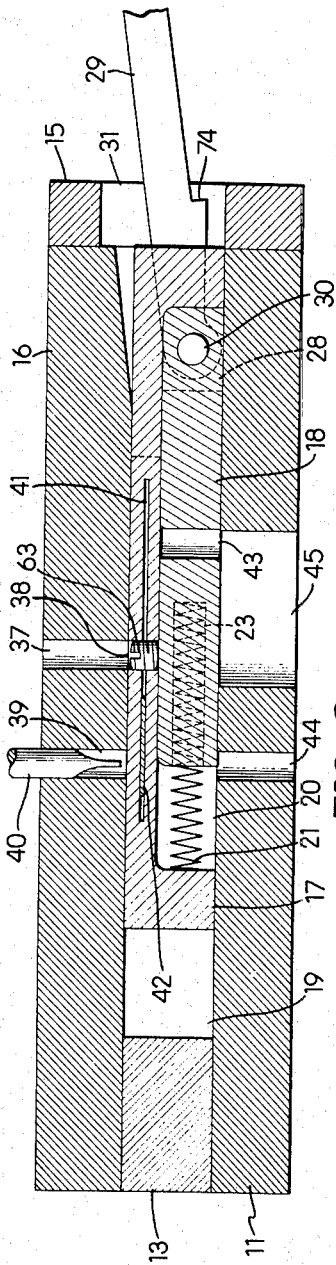
Fig. 3 is an enlarged detail section taken on the line 3—3 of Fig. 2, showing an article to be tested fed into the selector mechanism.

With the top and bottom slides in their normal position as shown in Figs. 1 and 3, the lead screw will be allowed to fall into a passageway 38 in the top slide 17. The thickness of that portion of the top slide between the cover plate 16 and the top surface of the bottom slide 18 is only very slightly greater than the length of one screw so that only one screw at a time can be positioned in the passageway 38 and so that the top slide can be reciprocated with a screw positioned therein. The cover plate is provided with another passageway 39 which serves as a communicating channel between a rotary driving member 40 and each screw in a manner to be described.

Figure 4:
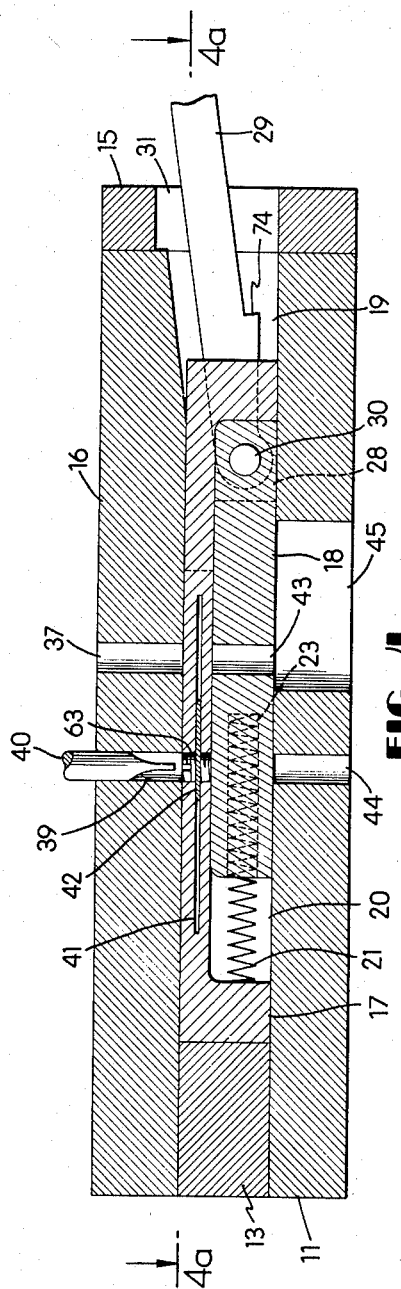
Fig. 4 is a similar section showing the article shifted to a position for testing.
Figure 4A:
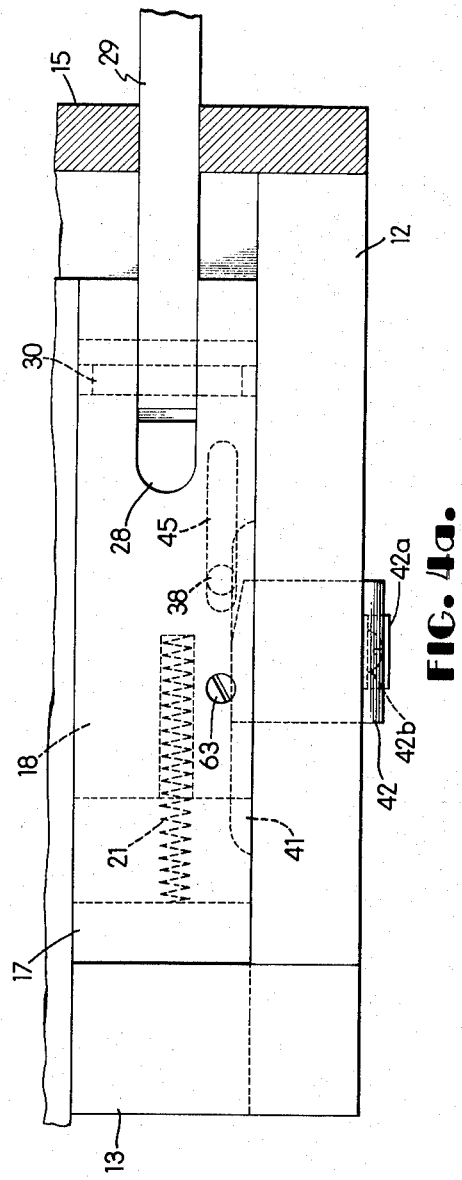
Fig. 4a is a section taken on line 4a—4a of Fig. 4 showing how the article is held in position by the blade member.

Cut into the side of the top slide 17 is a slot 41 which intersects a small portion of both passageways 38 and 39 as shown in Fig. 4a. A blade member 42 mounted in the side 12 of the base block 11 has its blade portion extending into the slot 41, said slot providing a clearance space so that the top slide may be reciprocated past said blade member. As best shown in Fig. 4a, the blade member 42 extends slightly into the passageway 39 but tapers away from the passageway 38 making it possible to have a screw positioned freely in the passageway 38 when the slides are in their normal position and to allow the blade member to engage the threaded portion of the screw when the top slide is moved toward the left. As shown in Fig. 1a, a slight pressure is exerted against the blade member 42 by a spring blade 42a attached to the side of the base block 11 by means of a screw 42b. The blade member 42 is thus urged into positive engagement with the threaded portion of a screw when the top slide is moved toward the left. There will be sufficient friction between the blade member 42 and the screw to prevent the screw from being moved due to vibrations of the device and such friction can be maintained even though the edge of the blade member wears away after an extended period of operation of the device.

The bottom slide 18 has a passageway 43 which serves as a communicating channel between the passageway 38 and either of two passageways 44 or 45 depending upon whether the screw in passageway 38 is properly positioned or not. The passageways 44 and 45 extend through the base block 11 and base 10, the passageway 44 accepting the properly positioned screws for conveyance to the inserting station of the assembling device while the passageway 45 accepts only the improperly positioned screws for conveyance to a reject box or the like.

The mechanism for testing against one end of each screw fed into the device to determine if each screw is properly positioned is shown in Fig. 1. This mechanism operates on the principle of continuously rotating the rotary driving member 40 and periodically causing it to descend into the passageway 38 to engage the end of a screw positioned therein and then retracting the rotary blade out of said passageway 38.

The rotary driving member 40, which in the present case is shown as a screwdriver blade, is coupled to a shaft 46 by means of a collet 47. The shaft 46 is slideably mounted in suitable bearings in two flanges 48 of a support column 49 and is caused to rotate by means of a belt 50 and pulley 51. The belt 50 is hooked up to a suitable pulley and drive motor (not shown) which continuously drives the shaft 46 as long as the device is turned on for operation.

In the normal position as shown in Fig. 1, the screwdriver blade is held out of the path of travel of the top slide 17 by means of a release plate 52. The release plate is attached by means of the two screws 53 to a release rod 54 which is pivotally mounted in the column 49. To one end of the release rod there is attached one end of a lever arm 55 which has its other end attached, by means of a pin 56, to the plunger 57 of a solenoid 58. A spring 59, extending between the lever arm and a stud 60 on the cover plate 16, normally causes the lever arm to pivot counterclockwise allowing the release plate 52 to push up against the underside of pulley 51. As a result, the shaft 46 and screwdriver blade are moved upward until a collar 61, fixed on the shaft, strikes against the underside of the upper flange 48.

It can be readily seen that energization of the solenoid 58 will cause the lever arm to pivot in a clockwise direction thereby dropping the release plate 52. As a result, the shaft 46 and screwdriver blade will descend until the blade is stopped by the screw. A second collar 62, fixed on the shaft, limits the descent of the blade, after the screw is driven past the stationary blade, by striking against the top surface of the upper flange 48. During the descent of shaft 46, the passageway 38 will be in alignment with the passageway 39, as shown in Fig. 5, to allow screw driver blade to engage against one end of a screw.

Figure 7:
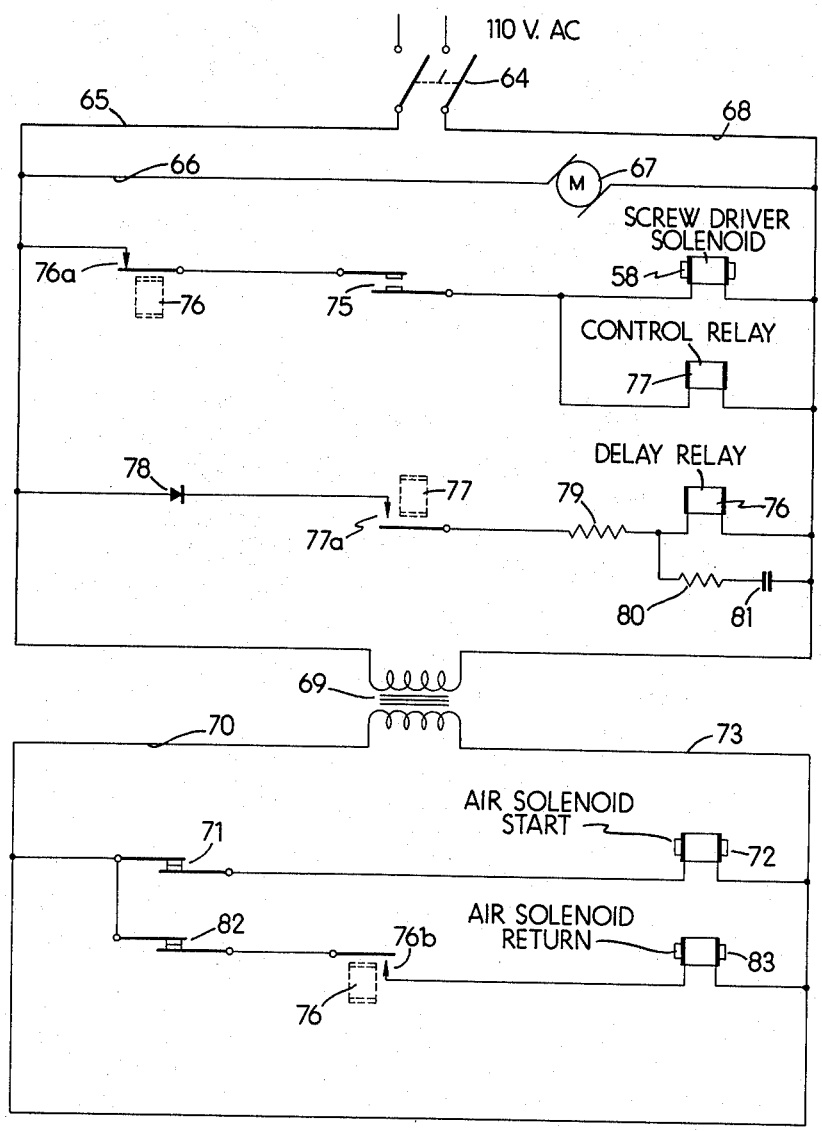
Fig. 7 is a wiring diagram of the device.

A complete cycle of operation of the device will now be described with references made to the wiring diagram shown in Fig. 7:

As was previously mentioned, this device is used to accept articles (headless set-screws, for instance) from a testing mechanism and selectively convey said articles to different destinations depending upon whether the articles are properly positioned or not. In the present application of the device, a suitable chute forces the individual delivery of the screws in an endwise direction from a hopper, but without attempting to force delivery to the testing mechanism with the slotted end first, or vice versa, the only condition being that they advance endwise through suitable channels leading to passageway 37.

The operation of the device begins with the position of the parts in Fig. 3. In this position the passageways 37 and 38 are in alignment, so that the screw 63 delivered to passageway 37 will drop downward into passageway 38 until it comes to rest on the upper face of the bottom slide 18. The screw 63 is shown with its slotted end up or, in other words, it was fed unslotted end first. All screws fed in this fashion are considered to be properly positioned and will pass through the device while those screws that are fed slotted end first are considered improperly positioned and will be rejected by the device.

Referring to the wiring diagram, closure of a switch 64 will complete a circuit from one side of the 110 volt A. C. supply, wire 65, wire 66, motor 67, wire 68 to the other side of the supply. Energization of the motor 67 will impart rotary motion to the shaft 46 and screw driver blade 40 through the belt 50 and pulley 51. At the same time transformer 69 is energized and current flows in the circuit leading from the secondary windings of 69, through wire 70, micro-switch 71, air solenoid 72, line 73 to the other side of the transformer secondary.

As shown in Fig. 2, the micro-switch 71 is closed by the coupling 25 when said coupling and arm 27 are at the extreme right-hand end of their travel in which position the bottom slide 18 is up against the end plate 15 as shown in Fig. 3.

Energization of the start air solenoid 72 by the circuit just traced will result in the air cylinder piston shaft 24 being pulled toward the left taking with it the coupling 25 and arm 27. During the course of such movement, the top and bottom slides are moved to the position shown in Fig. 4, the bottom slide being positively powered by the air cylinder and the top slide being moved by the bottom slide, by means of the spring 21, until it strikes against the locating block 13. It is to be noted that in this position the passageway 38 and screw 63 are in alignment with the passageway 39 and screw driver blade 40.

The piston shaft 24 continues to move toward the left until the bottom slide 18 strikes against the side of the cavity 20 in the top slide 17, as shown in Fig. 5, at which time the shaft 24 has reached the limit of its travel. It should be noted that in this position the pasageway 43 in the bottom slide is in alignment with passageways 38 and 39 and also the passageway 44 in the base block 11. The screw 63 is prevented from falling because the blade 42 engages the threaded portion of the screw, as shown in Fig. 4a, to hold it in the passageway 38. As the bottom slide reaches the limit of its travel toward the left, the triangular projection 32 on latch lever 29 clears the trip pin 33 and the lever drops to allow a notched portion 74 thereon to latch against the inner surface of the top slide. Thus, the top and bottom slides are locked against movement in either direction to maintain the passageways 38, 39, 43 and 44 in exact alignment.

Movement of the coupling 25 toward the left opens the micro-switch 71 and as it reaches the limit of its travel closes a micro-switch 75 (Fig. 2). Closure of micro-switch 75 completes a circuit from one side of the 110 volt supply, wire 65, the normally closed 76a points of a delay relay 76, the micro-switch 75, the screwdriver solenoid 58 and a control relay 77 to wire 68 and the other side of the supply.

Energization of the solenoid 58 causes the lever arm 55 (Fig. 1) and release rod 54 to pivot clockwise lowering the release plate 52 a sufficient amount to allow the shaft 46 to descend until the screwdriver blade 40 engages the end of screw 63 in the passageway 38. A time lapse now occurs to allow the screwdriver blade to test the end of the screw. The blade is revolving in the same direction as the helix of the screw thread and it can be readily seen that a properly positioned screw having its slotted end up, as shown in Fig. 5, will have its slot engaged by the screwdriver blade and will be screwed past the blade 42. The properly positioned screw is now free to fall through the passageways 43 and 44 to be conveyed to the inserting station of an assembly device or the like. Conversely, if the screw is improperly positioned with the slotted end down, the screwdriver blade just spins on the screw and the screw remains in the passageway 38 of the top slide.

The time lapse which occurs to give the screwdriver blade time to complete its function is brought about in the following manner:

As was previously mentioned, at the same time that the screwdriver solenoid 58 was energized, the control relay 77 was also energized by the same circuit. Energization of the control relay completes a circuit from one side of the 110 volt supply, wire 65, rectifier 78, the normally open 77a points of the control relay 77, now closed, a resistor 79, a resistor 80 and capacitor 81 to wire 68 and the other side of the supply. The resistor 80 and capacitor 81 are placed across the delay relay 76 and constitute a short circuit to delay the pick up of the relay until the capacitor becomes charged. This delay is sufficient to allow the screwdriver to drive the screw past the blade 42 before the delay relay will pick up.

When the delay relay 76 picks up, its normally closed 76a points are opened to drop out the screwdriver solenoid 58. At this point, then, the spring 59 (Fig. 1) will pivot the lever arm 55 and release rod 54 counter-clockwise which results in the release plate 52 raising the shaft 46 until the screwdriver blade is retracted clear of the top slide 17.

As the lever arm 55 returns to its home position it closes a micro-switch 82 attached to the side of the support column 49. This switch is normally closed, then, with the lever in its home position, but it does not complete a circuit until after the delay relay has picked, at which time a circuit is completed from one side of the 110 volt supply, wire 65, through transformer 69, wire 70, the closed micro-switch 82, through the normally open 76b points of the delay relay, now closed, a return air solenoid 83 and wire 73 to the other side of the supply.

Energization of the return air solenoid results in the piston shaft 24 and coupling 25 being forced toward the right, carrying therewith the bottom slide 18 which in turn is latched to the top slide 17. Therefore, as the slides start on their return stroke the passageways 38 and 43 remain in alignment since the two slides move in unison. Assuming that an improperly positioned screw, such as the one indicated at 84 in Fig. 6, was deposited in the passageway 38, the screwdriver will fail to drive the screw and it can be readily seen that the improperly positioned screw will be carried by the top slide back toward the tapered portion of the blade 42 until it becomes free from said blade and drops into the passageway 43 in the bottom slide.

The slides will continue their return stroke, the top slide returning to its normal position against the end plate 15 at which time the projection 32 on the latch lever 29 will cam over the trip pin 33 unlatching the bottom slide so that it can return to its normal position against the right side of the cavity 20 in the top slide. As the passageway 43 passes over the passageway 45 the improperly positioned screw 84 will fall into said passageway 45 for conveyance to a reject box or the like.

It is to be noted that when the delay relay 76 picked up, its normally closed 76a points opened dropping out the screwdriver solenoid 58 and the control relay 77. Dropping out of control relay 77 opened its 77a points which would tend to drop out the delay relay. However, it is not desired to drop out the delay relay at the time that the 77a points of relay 77 open because it is necessary to keep the normally open 76b points of the delay relay closed until the lever arm 55 returns to its home position and the micro-switch 82 is closed to bring about energization of the return air solenoid 83. The resistance capacitor combination across the delay relay takes care of this condition by delaying the actual drop out of the relay. When the 77a points of control relay 77 open, the charge on capacitor 81 discharges through resistor 80 and the delay relay to effectively hold the relay up until said charge is dissipated.

When the slides began their return stroke, coupling 25 opened the micro-switch 75 and upon reaching the home position closed micro-switch 71 to ready the device for another cycle of operation.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the in-

What is claimed is:

1. In a device for accepting an output of articles to be tested, presenting said articles to a testing device and then selectively conveying said articles to different destinations depending upon whether the articles are properly positioned or not, the combination of a fixed member having a first passageway adapted to receive articles to be tested and a second passageway for cooperation with said testing device, a movable member having a passageway normally in alignment with said first passageway to receive an article to be tested therefrom, a second movable member adjacent said first movable member and having a passageway normally out of alignment with said other passageways, a resilient member extending between said movable members to normally position said second movable member against one end of said first movable member, means for imparting motion to said second member, said first movable member being moved in unison therewith by means of said resilient member and carrying with it the article positioned in the passageway therein, a blade member, means for supporting said blade member with a portion thereof extending into the path of the article carried by said first movable member, means for stopping movement of said first movable member in a position where the article carried thereby will be engaged by said blade and will be in alignment with said second passageway, and means for continuing movement of said second movable member until it strikes the opposite end of said first movable member to align the passageway in said second member with said article and second passageway to provide a path into which a properly positioned article may be discharged from said blade member.

2. A device as in claim 1 characterized by latching means on said second movable member operative to latch said movable members together when said second passageway, the article to be tested, and the passageway in said second movable member are in alignment.

3. A device as in claim 1 characterized by latching means on said second movable member operative to latch said movable members together when said second passageway, the article to be tested, and the passageway in said second movable member are in alignment, a stationary support member for said movable members having a passageway positioned for alignment with said aligned passageways when said first movable member is stopped by said stop means to provide a discharge path from the device for a properly positioned article, means to impart a reverse movement to said latched movable members to bring said aligned passageways to a position where an improperly positioned article in the passageway in said first movable member will be free of said blade member, and another passageway in said support member over which said aligned passageways pass when the improperly positioned article is free of said engaging means, said last-named passageway providing a discharge path from the device for an improperly positioned article.

4. A device as in claim 1 characterized by latching means on said second movable member operative to latch said movable members together when said second passageway, the article to be tested, and the passageway in said second movable member are in alignment, a stationary support member for said movable members having a passageway positioned for alignment with said aligned passageways when said first movable member is stopped by said stop means to provide a discharge path from the device for a properly positioned article, means to impart a reverse movement to said latched movable members to bring said aligned passageways to a position where an improperly positioned article in the passageway in said first movable member will be free of said blade member, another passageway in said support member over which said aligned passageways pass when the improperly positioned article is free of said engaging means, said last-named passageway providing a discharge path from the device for an improperly positioned article, and cam means operative during said reverse movement to cause said latching means to unlatch said movable members.

References Cited in the file of this patent

UNITED STATES PATENTS

| | | |
|---|---|---|
| 1,411,169 | Ehrman | Mar. 28, 1922 |
| 2,015,573 | Strickland | Sept. 24, 1935 |
| 2,303,005 | Swangren | Nov. 24, 1942 |
| 2,599,655 | Netschert | June 10, 1952 |
| 2,638,945 | Austin | May 19, 1953 |